United States Patent [19]

Challener, IV

[11] Patent Number: 5,620,792

[45] Date of Patent: Apr. 15, 1997

[54] MAGNETO-OPTIC RECORDING MEDIUM HAVING CONSTANT REFLECTANCE OVER A RANGE OF WAVELENGTHS

[75] Inventor: William A. Challener, IV, Grant Township, Minn.

[73] Assignee: Imation Corp., St. Paul, Minn.

[21] Appl. No.: 443,201

[22] Filed: May 18, 1995

Related U.S. Application Data

[63] Continuation of Ser. No. 152,204, Nov. 15, 1993, abandoned.

[51] Int. Cl.$^6$ .............................. G11B 5/66; B32B 5/16; B05D 5/12
[52] U.S. Cl. ............... 428/332; 428/333; 428/336; 428/694 ML; 428/694 DE; 428/694 XS; 428/694 NF; 428/900; 427/127; 427/128; 427/129; 427/130; 427/131; 369/13; 369/275.1; 369/283; 369/286
[58] Field of Search ............... 428/694 DE, 694 ML, 428/694 XS, 694 NF, 332, 333, 336, 900; 427/127, 128, 129, 130, 131; 369/13, 275.1, 283, 286

[56] References Cited

U.S. PATENT DOCUMENTS

| | | | |
|---|---|---|---|
| 4,466,035 | 8/1984 | Connell et al. | 360/114 |
| 4,861,671 | 8/1989 | Muchink et al. | 428/457 |
| 4,920,007 | 4/1990 | Sawamura | 428/457 |
| 5,232,790 | 8/1993 | Arimune et al. | 428/694 TS |

FOREIGN PATENT DOCUMENTS

0560625A2  9/1993  European Pat. Off. ........ G11B 11/10

OTHER PUBLICATIONS

"Refractive indices of reactive magnetooptical thin films," Challener et al., *Applied Optics*, vol. 29, No. 20, Jul. 10, 1990, pp. 3040–3045.

*Primary Examiner*—Leszek Kiliman
*Attorney, Agent, or Firm*—Eric D. Levinson

[57] ABSTRACT

A multilayer medium comprising a substrate, a composite dielectric layer, a magneto-optic recording layer, another dielectric layer, and a reflective layer. The composite dielectric layer has two sublayers made of different materials with distinct refractive indices, or alternatively has a single layer with a refractive index gradient. The refractive index of the portion of the composite dielectric layer adjacent the substrate is about 0.3 to 1.0 greater than the refractive index of the portion of the composite dielectric layer adjacent the recording layer.

22 Claims, 1 Drawing Sheet

MAGNETO-OPTIC RECORDING MEDIUM HAVING CONSTANT REFLECTANCE OVER A RANGE OF WAVELENGTHS

This is a continuation of application No. 08/152,204 filed Nov. 15, 1993, now abandoned.

FIELD OF THE INVENTION

This invention relates to magneto-optic storage media which comprise a stack of thin film layers on a substrate.

BACKGROUND OF THE INVENTION

Magneto-optic recording systems comprise an optical read/write beam arrangement and a magnetizable storage medium, usually a disk. Writing is accomplished by a high intensity focused light beam, such as a laser, which alters the magnetization of the medium by heating a localized area of the medium above its Curie temperature and allowing the area to cool under an applied magnetic field. Reading is accomplished by a lower intensity plane-polarized beam which, upon transmission through and/or reflection from the medium, experiences a rotation in polarization through a characteristic angle $\theta$ or $-\theta$ depending on the local magnetization of the medium. Optical detectors may be used to translate the rotation angle into a binary data signal.

Magneto-optic storage media typically consist of a number of thin film layers applied to a substrate. The magnetizable recording layer is generally composed of an amorphous metal alloy having appropriate Curie temperature and coercivity values for good performance in magneto-optic recording.

Many of the elements which are suitable for the amorphous recording layer react strongly with oxygen and other elements which might be present in the immediate vicinity of the media. To protect the media from degradation, a transparent dielectric layer, also known as an interfering or protective layer, is usually deposited on one or both sides of the magnetizable amorphous layer. To be effective, the dielectric materials must not themselves react with the amorphous metal layer or any other layer, must offer chemical and physical resistance to degradation by heat, humidity and corrosive chemicals, and must be transparent at the wavelengths used for reading and writing of data. Such dielectric layers can also provide a thermal barrier to increase recording efficiency, and interference enhancement to increase the magneto-optic rotation angle.

Presently known dielectrics include silicon suboxide ($SiO_y$, y<2), titanium dioxide, silicon dioxide, cerium oxide, aluminum oxide, aluminum nitride, silicon nitride, silicon carbide, and metal or semi-conductor oxynitrides.

The speed at which the medium can be read and the reliability of the resulting data depend upon the magneto-optic properties of the medium. An important property for optimum performance is the readout carrier to noise ratio (CNR). The CNR is known to be dependent on rotation angle ($\theta$) and ellipticity ($\epsilon$), as well as the reflectance (R) of the medium.

The thickness of the various layers of the magneto-optic medium, together with the optical properties of the materials used in the medium, affect the performance of the medium. In a conventional magneto-optic medium comprising a magnetic recording layer, two dielectric layers and a reflective layer, R and $\epsilon$ may be controlled independently by adjusting the thicknesses of the two dielectric layers, while $\theta$ remains dependent. The media sensitivity, or laser power requirement for reading and writing, can be adjusted independently by varying the thickness of the reflective layer.

A magneto-optic drive is generally designed to operate best when these media properties are within certain ranges. Therefore, the construction of a magneto-optic medium is often "tuned" for satisfactory performance at the specific laser beam wavelength $\lambda$ of a particular drive. Current drives generally contain lasers having wavelengths in the range of approximately 780 nm to 830 nm. The parameters R, $\theta$, and $\epsilon$ vary significantly with $\lambda$, meaning that a medium suited for use at long laser beam wavelengths may not be compatible with a drive having a shorter wavelength laser.

SUMMARY OF THE INVENTION

The present invention relates to a magneto-optic recording medium for providing minimized reflectance variation over a range of wavelengths of an incident light beam. The medium comprises, in order, a substrate, a composite dielectric layer having a refractive index $n_1$ at the dielectric layer's interface with the substrate and a refractive index $n_2$ ($n_2<n_1$) at the opposite side of the dielectric layer, a magnetizable recording layer, an optional second dielectric layer, and a reflective layer. The composite layer may be made of two contiguous, substantially discrete sublayers of different dielectric materials having different refractive indices. Alternatively, the composite layer may consist of a single dielectric layer having a refractive index gradient through its thickness. The difference $\Delta n$ between $n_2$ and $n_1$ is preferably at least 0.1 and more preferably within the range of from about 0.3 to 1.0. Refractive index $n_1$ is preferably within the range of from about 1.8 to 3.0 and $n_2$ is preferably within the range of from about 1.4 to 2.5.

The total percentage specular reflectance at normal incidence of the medium is preferably within the range of from about 18 to 30%, and more preferably from about 22 to 26% over a range of wavelengths from 400 to 850 nm. The highest percentage specular reflectance measured over the range of wavelengths is preferably less than about 1.25 times as great as the lowest percentage reflectance measured over the range, and more preferably less than about 1.1 times as great.

The thicknesses of the layers in the medium may be adjusted to optimize reflectance, ellipticity, and media sensitivity independently for a particular wavelength. The additional degree of freedom provided by the composite dielectric layer then allows the reflectance variation to be minimized over a range of wavelengths.

The result is a magneto-optic medium which will perform effectively with a variety of read and write beam lasers in the visible and near infrared wavelength range.

DETAILED DESCRIPTION

Figure 1:
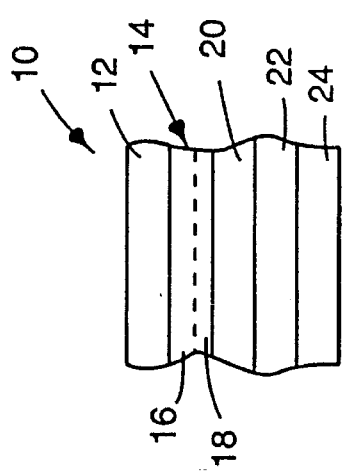
FIG. 1 is a diagram of the layers comprising one embodiment of the magneto-optic medium of the present invention.

Layered stack 10 according to the present invention is shown in FIG. 1. Layered stack 10 is comprised of, in order, substrate 12, composite dielectric layer 14, magneto-optic recording layer 20, an optional second dielectric layer 22, and reflective layer 24.

Substrate 12 may be formed of any material which is nonmagnetic and dimensionally stable, thus minimizing noise and displacement variations during recording and playback. Suitable substrates include glass, spinel, quartz, sapphire, aluminum oxide, metals such as aluminum and copper, and polymers such as polymethylmethacrylate (PMMA), polycarbonate (PC), amorphous polyolefin and polyester. Glass is preferable for applications requiring high dimensional stability, while polymers are preferred for mass-produced media due to their comparatively lower cost. Transparent substrates are required for a substrate incident medium. The substrate is typically a disk having a nominal diameter of 64 mm, 86 mm or 130 min.

Magneto-optic recording layer 20 typically comprises an alloy of at least one rare earth element and at least one transition metal, such as Tb-Fe-Co, Gd-Tb-Fe, Nd-Dy-Fe-Co, and Tb-Fe.

Composite dielectric layer 14 is deposited between substrate 12 and magneto-optic recording layer 20. Dielectric layer 14 protects magneto-optic recording layer 14 from corrosion due to reaction with elements in the surrounding environment or impurities in substrate 12. Composite dielectric layer 14 also serves as a thermal barrier to protect substrate 12 from heat generated by the write light beam, and provides interference enhancement to increase the characteristic magneto-optic rotation angle and reduce the reflectivity of the medium.

Composite dielectric layer 14 has a first refractive index $n_1$ at the interface with substrate 12 and a second refractive index $n_2$ at the interface with recording layer 20, such that $n_1$ is at least 0.1 greater than $n_2$. The difference between $n_1$ and $n_2$, $\Delta n$, is preferably within the range of from about 0.3 to 1.0, and most preferably about 0.8. Refractive index $n_1$ is preferably within the range of from about 1.8 to 3.0, and more preferably about 2.5. Refractive index $n_2$ is preferably within the range of from about 1.4 to 2.5, and more preferably about 1.7. The above values for $n_1$, $n_2$, and $\Delta n$ are for light having a wavelength of 600 nm.

Composite dielectric layer 14 may be comprised of a single dielectric layer having a refractive index gradient though its thickness. Preferred materials for composite dielectric layer 14 include $SiO_xN_y$, $SiC_xN_y$, $SiC_xH_y$, and $AlO_xN_y$. In the alternative, composite dielectric layer 14 may be made of two contiguous, substantially discrete sublayers 16 and 18 made of different dielectric materials. The refractive indices $n_1$ and $n_2$ of sublayers 16 and 18, respectively, should be within the same ranges as given above.

Sublayers 16 and 18 can be made from materials chosen from a group of known dielectric materials which are substantially transparent in the laser beam wavelength range 400 nm to 900 nm, substantially nonreactive with recording layer 20, and able to be applied by known thin film deposition techniques such as sputtering. Substantially transparent dielectric materials have an imaginary portion of the refractive index (K), also known as the extinction coefficient, of less than 0.15 over this range. Useful dielectric materials for the first sublayer (having the higher refractive index) include SiC, SiC:H, SiN, SiON, $TiO_2$, and diamond-like carbon. Useful dielectric materials for the second sublayer include $MgF_2$, $YO_x$, $SiO_x$, $SiO_xN_y$, SiC:H, and $AlO_xN_y$.

Optional second dielectric layer 22 is deposited between recording layer 20 and reflective layer 24. Second dielectric layer 22 protects the magneto-optic alloy in recording layer 20 from reacting with the materials in reflective layer 24 or elements in the surrounding environment, while reducing heat conduction away from the recording layer. Second dielectric layer 22 also provides additional interference enhancement, thereby improving the output signal of the read light beam. Second dielectric layer 22 typically comprises a substantially transparent dielectric material such as silicon dioxide ($SiO_2$), although other known dielectric materials which do not substantially react with the magneto-optic alloy may be used.

Reflective layer 24 typically comprises a material such as copper, aluminum, gold, or an alloy of those materials. Reflective layer 24 typically has a reflectance that is greater than 50% at the light beam recording wavelength. Reflective layer 24 typically comprises an aluminum chromium (Al—Cr) alloy with about 4% by weight (2% atomic) chromium.

The thicknesses of the layers in stack 10 according to the present invention can be determined using one of two methods to minimize reflectance variation while retaining the magneto-optic rotation effect. If composite dielectric layer 14 is comprised of sublayers 16 and 18 having distinct refractive indices which are accurately known, and the sublayers do not interact with each other, layer thicknesses may be determined using a thin film optical modeling computer program. The program makes use of known equations (such as those described in *Optical Waves in Layered Media* by Pochi Yeh (New York: John Wiley & Sons, 1988)) to calculate iteratively the expected magneto-optical properties of the medium.

If there is a physical or chemical interaction between sublayers 16 and 18, such as a partial migration from one sublayer into the other, or if composite dielectric layer 14 is made of a single layer having an unknown refractive index gradient, then the optimum layer thicknesses may be determined by an experimental iteration procedure. This procedure may be performed as follows.

The approximate starting thicknesses of layers 12, 14, (16, 18), 20, 22, and 24 are determined using a computer modeling program. Next, the reflectance at the desired long wavelength is measured. The thickness of sublayer 16 of composite dielectric layer 14 is then adjusted iteratively to obtain the desired long wavelength reflectance, $R_{long}$ (changing the thickness of the sublayer to change the reflectance). The thickness of sublayer 18 of composite dielectric layer 14 is then adjusted iteratively to obtain the short wavelength reflectance, $R_{short}$, which minimizes the reflectance variation, $R_{long} - R_{short}$, for the wavelength range under consideration. The thickness of sublayer 18 is changed depending on whether $R_{short}$ is too high or too low. Once $R_{long} - R_{short}$ has been reduced to the desired value, $R_{long}$ is measured again. If $R_{long}$ is no longer at the desired value, the thickness of sublayer 16 is adjusted iteratively to obtain a new desired $R_{long}$. The thicknesses of sublayers 16 and 18 are then iteratively readjusted until the desired values for $R_{long}$ and $R_{long} - R_{short}$ are achieved.

Next, the ellipticity $\epsilon$ is measured. The thickness of second dielectric layer 22 is iteratively adjusted until the desired value of $\epsilon$ is obtained. Since this adjustment usually affects the reflectance values of layered stack 10, the thicknesses of the dielectric sublayers 16 and 18 are adjusted as necessary.

Recording layer 20 typically has a thickness within the range of from about 20 to 30 nm. The thickness of recording layer 20 can be adjusted within this range to improve the optical and thermal properties of layered stack 10.

Reflective layer 24 is preferably optically opaque at wavelengths over 400 nm, and the specular reflectance of layered stack 10 at normal incidence, including both front and back surface reflections, is preferably within the range of from about 18% to 30% over a range of wavelengths from 400 nm to 850 nm, more preferably within the range from about 22% to 26%, and most preferably about 24%.

The highest percentage specular reflectance measured over the range of wavelengths from 400 nm to 850 nm is preferably less than 1.25 times as great as the lowest percentage measured over the range. For example, if the minimum reflectance over the range is 24% reflectance, the maximum reflectance should not be greater than 1.25 times 24%, i.e., 30%. More preferably, the highest percentage reflectance is less than 1.1 times as great as the lowest percentage reflectance measured over the range of wavelengths from 400 to 850 nm. Thus, if the minimum specular reflectance over the range were about 20%, the maximum specular reflectance over the range would not exceed about 22%.

The layers comprising the magneto-optic recording medium of this invention can be made by known vacuum deposition techniques which are capable of producing thin, defect-free films of uniform and controllable thicknesses. Useful sputtering techniques include RF and DC magnetron; triode, diode, e-beam evaporation, thermal evaporation, and ion-beam sputtering. Those skilled in the art are able to choose sputtering conditions such as gas flow rate, target power density, and sputtering time to obtain a film of the desired thickness and composition.

Targets are presputtered for a suitable length of time to clean their surfaces. Presputtering is accomplished by running the vacuum deposition system at operating conditions while shielding the substrate from the sputtered material leaving the target. When sputtering a sequence of layers in a single chamber with a reactive gas, the chamber is cleared between sputtering cycles under vacuum for a sufficient time to remove residual gas from the previous sputtering cycle.

A composite layer 14 having a refractive index gradient through its thickness can be made by various sputtering processes. For example, the gas pressure can be varied during the sputtering process, the gas mixture can be changed (e.g., the ratio of $O_2$ to $N_2$), or two or more targets can be co-sputtered as the substrate is moved slowly by them in sequence.

The invention will be further illustrated by the following examples. (All measurements approximate.)

EXAMPLE 1

The media were prepared using a batch vacuum deposition system consisting of a single cylindrical chamber equipped with a cryopump. Within the chamber were four sputtering guns including a triode apparatus, two magnetrons with DC power sources and one magnetron with an RF power source. The sputtering guns were shielded from one another with metal baffles to minimize cross-contamination. The target for the triode comprised a terbium-iron-cobalt (Tb-Fe-Co) alloy. One of the DC magnetrons had a commercially available silicon carbide (SiC) target containing approximately 50% by weight silicon while the other DC magnetron had an aluminum chromium (AlCr) alloy target containing approximately 2% by atomic chromium. The target for the RF magnetron comprised a magnesium fluoride ($MgF_2$) dielectric material.

Substrates were mounted in the chamber on a planetary mounting platform located above the sputtering guns. Substrates included a 130 mm diameter polycarbonate disk having one grooved side, a 2.5 cm by 7.6 cm glass microscope slide, a 19 $cm^2$ polyimide film, and a 5.1 cm diameter silicon wafer. The polycarbonate disks were mounted on the planetary so that the grooved side would be coated. The planetary was adapted to be rotatable at a controlled speed during sputtering. In addition, the substrates were able to be independently rotated on the rotating planetary during sputtering to maximize the uniformity of the thin film deposition. Process conditions for presputtering and sputtering cycles were entered into a computer adapted to control the operation of the vacuum deposition system. The chamber was then sealed and evacuated for at least 12 hours to a base pressure of about 0.05 mPa ($4\times10^{-7}$ torr).

The targets were presputtered according to the following sequence, with the planetary in a stationary position so that the substrates were not coated by the sputtered material. First, the $MgF_2$ target was presputtered for 15 minutes using the RF magnetron in an argon gas atmosphere at a pressure of 400 mPa ($3\times10^{-3}$ torr) and a constant forward power of 400 W and a target power density of 8.7 $W/cm^2$. After sputtering was complete, the chamber was cleared for about 5 minutes under continuous vacuum to avoid cross-contamination between sputtering cycles. The SiC target was then presputtered for 15 minutes using one DC magnetron in a gas mixture of about 90% argon by volume and 10% methane at 800 mPa ($6\times10^{-3}$ torr) and a constant power of 1000 W. After a clearing period of approximately 15 minutes, the AlCr target was presputtered for 10 minutes using the other DC magnetron at 117 mPa ($8.8\times10^{-4}$ torr) argon gas pressure and 500 W power. Finally, after about a 15-minute clearing period, the Tb-Fe-Co target was presputtered for 10 minutes using the triode with an argon gas pressure of 160 mPa ($1.2\times10^{-3}$ torr). The target voltage remained constant at 400 V, with a plasma current of 6 A and an emitter current of 35 A, resulting in 730 W on the target.

After waiting about 15 minutes to clear the chamber, the thin films were deposited on the substrates in the following manner. First, a gas flow comprising a mixture of argon and methane was introduced into the chamber to give 800 mPa ($6\times10^{-3}$ torr) pressure. The $Ar/CH_4$ mixture comprised 10% $CH_4$ by volume. To deposit the first sublayer of the D1 layer, the SiC target was sputtered using the DC magnetron at 1000 W power for 4 minutes, 14 seconds to give an approximate layer thickness of 390 Å. The presence of $CH_4$ in the gas mixture resulted in hydrogenation of the sputtered layer, giving a SiC:H composition. The chamber was allowed to clear for approximately 30 minutes to remove any remaining methane gas. The second sublayer of the composite dielectric layer was then deposited by sputtering the $MgF_2$ target using the RF magnetron at 400 W power and an argon pressure of 400 mPa ($3\times10^{-3}$ torr) for 52 minutes, 5 seconds to give an approximate layer thickness of 400 Å. After clearing the chamber for about 15 minutes, the magneto-optic recording layer was deposited using the triode at 740 W power. The Tb-Fe-Co target was sputtered at 160 mPa ($1.2\times10^{-3}$ torr) pressure in argon for 56 seconds to give an approximate layer thickness of 200 Å. After clearing the chamber for about 15 minutes, the second dielectric layer was then deposited by again sputtering the SiC target with the DC magnetron at 1000 W power. The same argon/methane gas mixture used for the first dielectric sublayer was introduced to give 800 mPa ($6\times10^{-3}$ torr) pressure for a duration of 2 minutes, 43 seconds to give an approximate layer thickness of 250 Å. Finally, after another clearing period of about 15 minutes, the reflective layer was deposited using the DC magnetron at 500 W power. The AlCr target was sputtered at 117 mPa ($8.8\times10^{-4}$ torr) argon pressure for 10 minutes, 32 seconds to give an approximate layer thickness of 1100 Å. The sputtering chamber was then vented to the atmosphere so that the finished substrates could be removed.

To measure the index of refraction of the first sublayer of the composite dielectric layer, the SiC:H film was deposited alone on a glass slide using the same sputtering conditions described above. Reflectance and transmittance measurements on the glass slide were used to determine that the real part of the index of refraction ($n_1$) varying from about 2.06 at 400 nm wavelength to 1.96 at 850 nm wavelength. The imaginary part of the index of refraction (K) varied from about 0.12 at 400 nm to 0.00 at 850 nm. In a similar manner, the second sublayer comprising $MgF_2$ was deposited by itself on a glass slide using the sputtering conditions described above. The real part of the index of refraction ($n_2$) of this layer varied over the range of about 1.52 at 500 nm to 1.59 at 850 nm. The imaginary part of the index of refraction (K) ranged from about 0.045 at 400 nm to about 0.002 at 850 nm.

Figure 2:
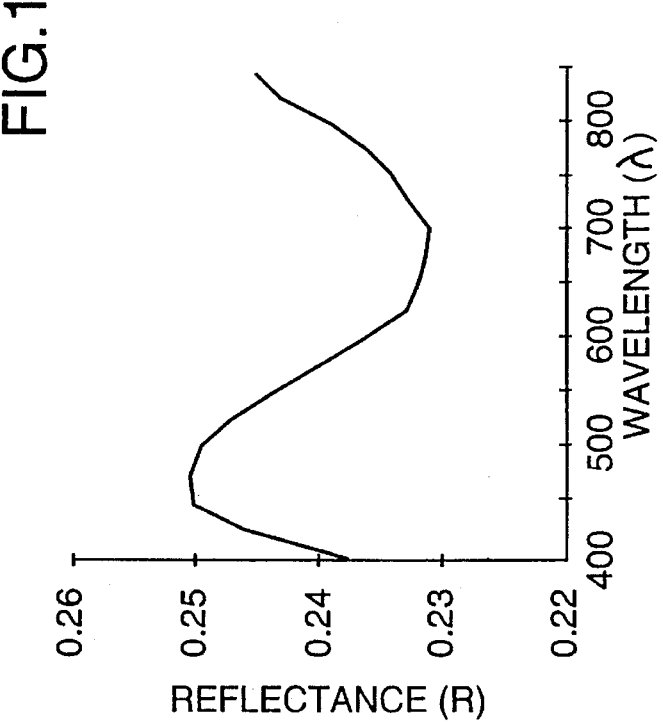
FIG. 2 is a graphical representation of the relationship between specular reflectance (R) and incident beam wavelength ($\lambda$) for a magneto-optic medium prepared according to Example 1.
Figure 3:
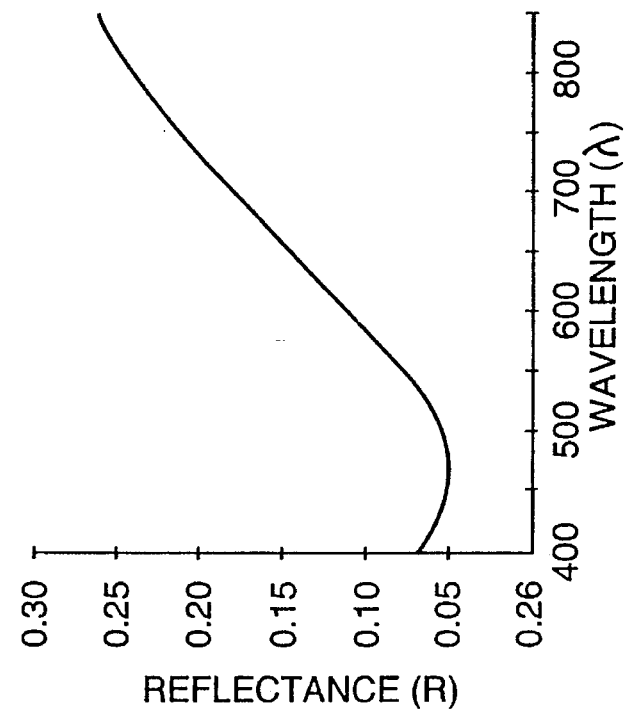
FIG. 3 is a graphical representation of the relationship between specular reflectance (R) and incident beam wavelength ($\lambda$) for a prior art magneto-optic medium.

The atomic % composition of the Tb-Fe-Co film comprising the magneto-optic recording layer was measured on the silicon wafer by x-ray fluorescence spectroscopy to be approximately 25.3% Tb, 64.8% Fe, and 9.9% Co. A graph of the specular reflectance (R) as a function of incident beam wavelength ($\lambda$) over a range of 400 nm to 850 nm is shown in FIG. 2. The specular reflectance (R) of the glass microscope slide substrate coated with the five thin film layers was found to be 24±1% when measured through the glass in the wavelength range of 400 nm to 850 nm, as shown in FIG. 2. This represents a vast improvement over commercially available magneto-optic recording media, the reflectance of which varies greatly over the same range of wavelengths. As shown in FIG. 3, the specular reflectance of the prior art media (line 32) varied from a low of about 5% to a high of about 25%, a relative percentage increase of 500%. In contrast the measurement of 24%±1% for the present invention (FIG. 3) represents a relative percentage increase for the high end of the specular reflectance range (25%) over the low end (23%) of only about 8%.

Carrier to noise ratio (CNR) was tested on the coated disk by recording a 3.7 MHz signal at 26% duty cycle using an 830 nm laser at a 30 mm radius with the disk spinning at 1800 rpm. This gave a recorded mark length of 0.76 μm. The track was initially erased with an 8 mW laser power in a −400 Oe field, before being written with a 6.5 mW laser power in a +200 Oe field. The recorded signal was read at 1.5 mW and the measured CNR was 41.0 dB using the industry standard 30 kHz bandwidth.

EXAMPLE 2

A second set of substrates was coated in the same manner as Example 1, except that the total deposition time for the second sublayer of the composite dielectric layer was only 3 minutes, 48 seconds to give an approximate layer thickness of 350 Å. The specular reflectance of the glass microscope slide after deposition measured through the glass was 18.5±1% in the wavelength range from 400 nm to 850 nm.

I claim:
1. A magneto-optic recording medium, comprising, in order:
   a substrate;
   a first dielectric layer, comprised of at least one layer;
   a magneto-optic recording layer;
   a second dielectric layer; and
   a reflective layer;
   wherein the first dielectric layer has a first index of refraction $n_1$ at the interface with the substrate and a second index of refraction $n_2$ at the interface with the recording layer, wherein $n_1-n_2$, $\Delta n$, is within the range of from about 0.3 to 1.0, and wherein the medium is optically tuned over a range of wavelengths so that the medium has a specular reflectance at normal incidence within the range of about 18% to 30% over a range of wavelengths from 400 nm to 850 nm.
2. The medium of claim 1, wherein $1.8 \leq n_1 \leq 3.0$ and $1.4 \leq n_2 \leq 2.5$.
3. The medium of claim 1, wherein the first dielectric layer is comprised of two sublayers, the first sublayer being adjacent the substrate and having an index of refraction equal to $n_1$, and the second sublayer being adjacent the recording layer and having an index of refraction equal to $n_2$.
4. The medium of claim 1, wherein the first dielectric layer consists of a single layer, and wherein the layer has a refractive index gradient through its thickness.
5. The medium of claim 1, wherein the reflectance is within the range of from about 22% to 26%.
6. The medium of claim 1, wherein the medium is characterized by a specular reflectance at normal incidence having maximum and minimum values over a range of wavelengths from 400 nm to 850 nm, wherein the maximum value is less than 1.25 times as great as the minimum value.
7. The medium of claim 6, wherein the maximum value is less than about 1.1 times as great as the minimum value.
8. A magneto-optic recording medium, comprising, in order:
   a substrate;
   a first dielectric layer, comprised of at least one layer;
   a magneto-optic recording layer;
   a second dielectric layer; and
   a reflective layer;
   wherein the first dielectric layer has a first index of refraction $n_1$ at the interface with the substrate and a second index of refraction $n_2$ at the interface with the recording layer, wherein $n_1 - n_2$, $\Delta n$, is within the range of from about 0.3 to 1.0, and wherein the medium is optically tuned over a range of wavelengths so that the medium has a specular reflectance at normal incidence having maximum and minimum values over a range of wavelengths from 400 nm to 850 nm, wherein the maximum value is less than 1.25 times as great as the minimum value.
9. The medium of claim 8, wherein the maximum value is less than about 1.1 times as great as the minimum value.
10. The medium of claim 8, wherein the first dielectric layer is comprised of two sublayers, the first sublayer being adjacent the substrate and having an index of refraction equal to $n_1$ and the second sublayer being adjacent the recording layer and having an index of refraction equal to $n_2$.
11. The medium of claim 10, wherein the first dielectric layer consists of a single layer, and wherein the layer has a refractive index gradient through its thickness.
12. A magneto-optic recording medium, comprising, in order:

a substrate;

a first dielectric layer comprised of at least one layer;

a magneto-optic recording layer for creating a magneto-optical rotation effect;

a second dielectric layer; and a reflective layer;

wherein:

the first dielectric layer has a first index of refraction $n_1$ at the interface with the substrate and a second index of refraction $n_2$ at the interface with the recording layer, wherein $n_1 - n_2$, $\Delta n$, is within the range of from about 0.3 to 1.0;

wherein the medium has a specular reflectance at normal incidence which varies over a range of wavelengths from 400 nm to 850 nm; and values of $n_1$ and $n_2$, and the thicknesses of the layers are such that the specular reflectance is within the range from 18% to 30% over said wavelength range while the magneto-optical rotation effect is retained.

13. A magneto-optic recording medium, comprising, in order:

a substrate;

a first dielectric layer comprised of at least one layer;

a magneto-optic recording layer for creating a magneto-optical rotation effect;

a second dielectric layer; and a reflective layer;

wherein:

the first dielectric layer has a first index of refraction $n_1$ at the interface with the substrate and a second index of refraction $n_2$ at the interface with the recording layer, and wherein $n_1 - n_2$, $\Delta n$, is within the range of from about 0.3 to 1.0;

wherein the medium has a specular reflectance at normal incidence which varies over a range of wavelengths from 400 nm to 850 nm; and values for $n_1$ and $n_2$ and the thicknesses of the layers are selected to optimize the specular reflectance, R, and ellipticity, $\epsilon$, of the medium, while retaining the magneto-optical rotation effect, for a range of wavelengths so that the specular reflectance over the range from 400 to 850 nm is within the range from 18–30%.

14. A magneto-optic recording medium, comprising, in order:

a substrate;

a first dielectric layer comprised of at least one layer;

a magneto-optic recording layer for creating a magneto-optical rotation effect;

a second dielectric layer; and a reflective layer;

wherein:.

the first dielectric layer has a first index of refraction $n_1$ at the interface with the substrate and a second index of refraction $n_2$ at the interface with the recording layer, and wherein $n_1 - n_2$, $\Delta n$, is within the range of from about 0.3 to 1.0;

wherein the medium has a specular reflectance, R, at normal incidence having maximum and minimum values over a range of wavelengths from 400 nm to 850 nm; and values for $n_1$ and $n_2$ and the thicknesses of the layers are selected to optimize the specular reflectance, R, and ellipticity, $\epsilon$, of the medium, while retaining the magneto-optical rotation effect, for a range of wavelengths so that the maximum value of the specular reflectance is less than 1.25 times as great as the minimum value over the range from 400 to 850 nm.

15. A magneto-optic recording medium, comprising, in order:

a substrate;

a first dielectric layer comprised of at least one layer;

a magneto-optic recording layer for creating a magneto-optical rotation effect;

a second dielectric layer; and a reflective layer;

wherein:

the first dielectric layer has a first index of refraction $n_1$ at the interface with the substrate and a second index of refraction $n_2$ at the interface with the recording layer, and wherein $n_1 - n_2$, $\Delta n$, is within the range of from about 0.3 to 1.0;

wherein the medium has a specular reflectance at normal incidence having maximum and minimum values over a range of wavelengths from 400 nm to 850 nm; and the values of $n_1$ and $n_2$ and the thicknesses of the layers are such that the maximum value of the specular reflectance is less than 1.25 times as great as the minimum value over said wavelength range while the magneto-optical rotation effect is retained.

16. A magneto-optic recording medium comprising, in order:

a first dielectric layer having a thickness $t_1$, the first dielectric layer being comprised of at least one layer;

a magneto-optic recording layer having a thickness $t_2$ for creating a magneto-optical rotation effect;

a second dielectric layer having a thickness $t_3$; and a reflective layer having a thickness $t_4$;

wherein:

the first dielectric layer has a first index of refraction $n_1$ at the interface with the substrate and a second index of refraction $n_2$ at the interface with the recording layer, and wherein $n_1 - n_2$, $\Delta n$, is within the range of from about 0.3 to 1.0;

the medium has a specular reflectance, R, at normal incidence having maximum and minimum values over a range of wavelengths from 400 nm to 850 nm; and values for $t_1$, $t_2$, $t_3$, $t_4$, $n_1$, and $n_2$ are selected to optimize the specular reflectance, R, and ellipticity, $\epsilon$, of the medium, while retaining the magneto-optical rotation effect, for a range of wavelengths so that the maximum value of the specular reflectance is less than 1.25 times as great as the minimum value over the range from 400 to 850 nm.

17. A method of making a magneto-optic recording medium, the medium comprising, in order: a substrate, a first dielectric layer, a magneto-optic recording layer, a second dielectric layer, and a reflective layer, the method comprising the steps of:

selecting a first material having a first thickness $t_1$ for use as the first dielectric layer, the first dielectric layer being comprised of at least one layer;

selecting a second material having a thickness $t_2$ for use as a magneto-optic recording layer, the first dielectric layer having a first index of refraction $n_1$ at the interface with the substrate and a second index of refraction $n_2$ at the interface with the recording layer, wherein $n_1-n_2$, $\Delta n$, is within the range from about 0.3 to 1.0;

selecting a third material having a thickness $t_3$ for use as a second dielectric layer;

selecting a fourth material having a thickness $t_4$ for use as a reflective layer;

selecting values for $n_1$, $n_2$, $t_1$, $t_2$, $t_3$, and $t_4$ so that the medium has a specular reflectance at normal incidence having maximum and minimum values over a range of wavelengths from 400 nm to 850 nm; and optically tuning the medium comprised of the ordered layers by varying the values of $n_1$, $n_2$, $t_1$, $t_2$, $t_3$, and $t_4$ so that the maximum value of the specular reflectance over the range from 400 to 850 nm is less than 1.25 times as great as the minimum value.

18. A method of making a magneto-optic recording medium, wherein the medium has a specular reflectance at normal incidence within the range of 18% to 30% over a range of wavelengths from 400–850 nm, the medium comprising, in order, a substrate, a first dielectric layer, a magneto-optic recording layer, a second dielectric layer, and a reflective layer, the method comprising the steps of:

depositing the first dielectric layer on the substrate so that the first dielectric layer has a first index of refraction $n_1$ at the interface with the substrate and a second index of refraction $n_2$ at a side of the first dielectric layer opposite the substrate, wherein $n_1$-$n_2$, $\Delta n$, is within the range from about 0.3 to 1.0;

depositing the recording layer over the first dielectric layer;

depositing the second dielectric layer over the recording layer; and depositing the reflective layer over the second dielectric layer.

19. The method of claim 18, wherein $1.8 \leq n_1 \leq 3.0$ and $1.4 \leq n_2 \leq 2.5$.

20. The method of claim 18, wherein the step of depositing the first dielectric layer further comprises two separate deposition steps.

21. The method of claim 20, wherein said first deposition step involves depositing a first dielectric material having an index of refraction $n_1$, wherein $1.8 \leq n_1 \leq 3.0$, and said second deposition step involves depositing a second dielectric material having an index of refraction $n_2$, wherein $1.4 \leq n_2 \leq 2.5$.

22. The method of claim 21, wherein the first dielectric material comprises H:SiC and the second dielectric material comprises $MgF_2$.

* * * * *